US012560801B2

(12) United States Patent
Hsu

(10) Patent No.: US 12,560,801 B2
(45) Date of Patent: Feb. 24, 2026

(54) WAVELENGTH CONVERSION MODULE AND MANUFACTURING METHOD THEREOF

(71) Applicant: Coretronic Corporation, Hsin-Chu (TW)

(72) Inventor: Pi-Tsung Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 673 days.

(21) Appl. No.: 17/903,947

(22) Filed: Sep. 6, 2022

(65) Prior Publication Data

US 2023/0086834 A1 Mar. 23, 2023

(30) Foreign Application Priority Data

Sep. 17, 2021 (CN) .......................... 202111089915.0

(51) Int. Cl.
*G02B 26/00* (2006.01)
(52) U.S. Cl.
CPC .................................. *G02B 26/008* (2013.01)
(58) Field of Classification Search
None
See application file for complete search history.

(56) References Cited

U.S. PATENT DOCUMENTS

| | | | | |
|---|---|---|---|---|
| 2011/0304830 A1* | 12/2011 | Kato | ..................... | G03B 21/204 |
| | | | | 353/84 |
| 2014/0118991 A1* | 5/2014 | Lin | ...................... | G03B 21/204 |
| | | | | 362/324 |

| | | | | |
|---|---|---|---|---|
| 2018/0356716 A1* | 12/2018 | Hashizume | .......... | H04N 23/125 |
| 2020/0004118 A1* | 1/2020 | Hsu | ...................... | G02B 26/008 |
| 2020/0363709 A1 | 11/2020 | Yang | | |
| 2021/0373423 A1* | 12/2021 | Hsu | ...................... | G03B 21/204 |

FOREIGN PATENT DOCUMENTS

| | | |
|---|---|---|
| CN | 203489180 | 3/2014 |
| CN | 104713035 | 6/2015 |
| CN | 106483746 | 3/2017 |
| CN | 106896631 | 6/2017 |
| CN | 208937891 | 6/2019 |
| CN | 111435216 | 7/2020 |
| CN | 111752079 | 10/2020 |
| CN | 111830773 | 10/2020 |
| CN | 211826878 | 10/2020 |
| CN | 112236706 | 1/2021 |
| CN | 213276238 | 5/2021 |
| TW | 200909979 | 3/2009 |

OTHER PUBLICATIONS

"Office Action of China Counterpart Application", issued on Jul. 4, 2025, p. 1-p. 9.

* cited by examiner

*Primary Examiner* — Robert E. Tallman
(74) *Attorney, Agent, or Firm* — JCIPRNET

(57) ABSTRACT

A wavelength conversion module and a manufacturing method thereof are provided. The wavelength conversion module includes a wavelength conversion substrate, a driving assembly, and a polymer adhesive ring. The driving assembly is connected to the wavelength conversion substrate to drive the wavelength conversion substrate to rotate around an axis of the driving assembly. The polymer adhesive ring is disposed on the wavelength conversion substrate.

20 Claims, 19 Drawing Sheets

100a

116

130b
160

150

X

133

113

111

114

110a

120

100b

100c

WAVELENGTH CONVERSION MODULE AND MANUFACTURING METHOD THEREOF

CROSS-REFERENCE TO RELATED APPLICATION

This application claims the priority benefit of China application serial no. 202111089915.0, filed on Sep. 17, 2021. The entirety of the above-mentioned patent application is hereby incorporated by reference herein and made a part of this specification.

BACKGROUND

Technical Field

The invention relates to an optical module and a manufacturing method thereof, and particularly relates to a wavelength conversion module and a manufacturing method thereof.

Description of Related Art

In a projector with a laser light source, a phosphor wheel is located on a transmission path of an excitation light beam generated by the laser light source. For example, a blue laser light beam emitted by a blue laser light source is projected on a light conversion region with a phosphor material on the phosphor wheel, so as to excite the phosphor material and to generate a yellow converted light beam. Generally, the structure of the phosphor wheel will be assembled with a metal balance weight ring for subsequent dynamic balance calibration. A material of the metal balance weight ring is, for example, a metal material such as aluminium, copper, stainless steel, etc., and a processing and forming method thereof is completed by using a mechanical lathe or a milling machine, or by using a stamping procedure, etc. In addition, the dynamic balance calibration of the phosphor wheel may be achieved by, for example, a weight-adding method or a weight-removing method, where the weight-adding method is to directly fill or stick a balance weight on the metal balance weight ring, and the weight-removing method is to use a drilling machine or similar equipment to drill blind holes or through holes at positions where the weight of the metal balance weight ring needs to be reduced, so as to remove weight.

However, due to large differences in coefficients of thermal expansion and physical properties of the balance weight and metal balance weight ring used in the weight-adding method, adhesion stability there between is poor, which causes a risk that the balance weight flies away when the phosphor wheel is rotated at a high speed. In addition, current assembly of the phosphor wheel requires at least two adhesive layers to adhere an adapter ring, a substrate, a coated glass, and a driving assembly together. However, the more layers of adhesives are used, the higher complexity of the manufacturing process is, the more working hours are required, and the higher the production cost is, and the higher reliability risk of derivative structures.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a wavelength conversion module, which has better structural reliability.

The invention is directed to a manufacturing method of a wavelength conversion module, which is used to manufacture the above-mentioned wavelength conversion module, and is adapted to simplify a structure, and reduce a production procedure and production cost.

Other objectives and advantages of the invention may be further illustrated by the technical features broadly embodied and described as follows.

In order to achieve one, a part, or all of the objectives or other objectives, an embodiment of the invention provides a wavelength conversion module including a wavelength conversion substrate, a driving assembly, and a polymer adhesive ring. The driving assembly is connected to the wavelength conversion substrate to drive the wavelength conversion substrate to rotate around an axis of the driving assembly. The polymer adhesive ring is disposed on the wavelength conversion substrate.

In an embodiment of the invention, a material of the polymer adhesive ring includes silicon adhesive, acrylic adhesive, epoxy resin adhesive, or a combination of the above adhesives.

In an embodiment of the invention, the polymer adhesive ring is mixed with a plurality of filling particles, and the filling particles include a plurality of polymer particles, a plurality of glass particles, a plurality of ceramic particles, a plurality of metal particles, or a combination of the above particles.

In an embodiment of the invention, the filling particles substantially account for less than 95% of a volume of the polymer adhesive ring.

In an embodiment of the invention, a particle size of each of the filling particles is substantially between 0.0001 mm and 0.5 mm.

In an embodiment of the invention, a tensile strength of the polymer adhesive ring mixed with the filling particles is substantially greater than 50 kg/cm$^2$.

In an embodiment of the invention, the wavelength conversion module further includes a first adhesive layer and a second adhesive layer. The first adhesive layer is disposed between the polymer adhesive ring and the wavelength conversion substrate. The second adhesive layer is disposed between the driving assembly and the wavelength conversion substrate.

In an embodiment of the invention, materials of the first adhesive layer and the second adhesive layer respectively include silicon adhesive, epoxy resin adhesive, acrylic adhesive, inorganic adhesive, or a combination of the above adhesives.

In an embodiment of the invention, the polymer adhesive ring is adhered to the wavelength conversion substrate. The wavelength conversion substrate has an upper surface and a lower surface opposite to each other. The polymer adhesive ring is located on the upper surface and extends onto a part of the lower surface.

In an embodiment of the invention, the wavelength conversion module further includes an adhesive layer disposed between the driving assembly and the polymer adhesive ring located on the lower surface of the wavelength conversion substrate.

In an embodiment of the invention, the polymer adhesive ring is adhered to the wavelength conversion substrate and the driving assembly. The wavelength conversion substrate has an upper surface and a lower surface opposite to each other. The polymer adhesive ring is located on the upper surface and extends between the lower surface and the driving assembly.

In an embodiment of the invention, the wavelength conversion substrate has a hollow ring shape, and the wavelength conversion substrate and the polymer adhesive ring are respectively arranged coaxially with the driving assembly.

In an embodiment of the invention, the wavelength conversion substrate further includes an optical plate. The optical plate includes a light-transmitting plate or a reflecting plate.

In an embodiment of the invention, the wavelength conversion module further includes a balance weight attached into a groove of the polymer adhesive ring. A material of the balance weight includes silicon adhesive, epoxy resin adhesive, acrylic adhesive, inorganic adhesive, or a combination of the above adhesives.

In an embodiment of the invention, the polymer adhesive ring has at least one hole, and the at least one hole includes at least one blind hole or at least one through hole.

In order to achieve one, a part, or all of the objectives or other objectives, an embodiment of the invention provides a manufacturing method of a wavelength conversion module, which includes following steps. A mold is provided, where the mold includes a first mold core, a support member, and a second mold core. The first mold core has a first open pore, and the second mold core has a second open pore. One end of the support member is detachably disposed in the first open pore, and the second open pore of the second mold core is adapted to be sleeved onto another end of the support member, so that the second mold core is assembled on the first mold core. The first mold core of the mold is filled with a polymer adhesive material. The second mold core is made to apply pressure on the first mold core filled with the polymer adhesive material for curing and molding. The first mold core, the support member, and the second mold core are separated to form a polymer adhesive ring. A wavelength conversion substrate is provided. A driving assembly and the wavelength conversion substrate are assembled. The driving assembly is connected to the wavelength conversion substrate.

In an embodiment of the invention, the wavelength conversion substrate is provided before the polymer adhesive material is filled in the first mold core of the mold. The wavelength conversion substrate is disposed between the first mold core and the second mold core. When the polymer adhesive material is filled in the first mold core, another polymer adhesive material is disposed on an upper surface of the wavelength conversion substrate at the same time. The second mold core applies pressure on the wavelength conversion substrate and the first mold core filled with the polymer adhesive material. The first mold core, the support member, and the second mold core are separated to form the polymer adhesive ring adhered to the wavelength conversion substrate.

In an embodiment of the invention, a curing temperature of the polymer adhesive material is lower than a melting point of the wavelength conversion substrate.

In an embodiment of the invention, the polymer adhesive ring is located on the upper surface of the wavelength conversion substrate and extends onto a part of a lower surface of the wavelength conversion substrate.

Based on the above description, the embodiments of the invention have at least one of following advantages or effects. In the design of the wavelength conversion module of the invention, the polymer adhesive ring is disposed on the wavelength conversion substrate, and the polymer adhesive ring is manufactured by a mold. Compared with the metal balance weight ring formed by using the mechanical lathe, milling machine or the stamping process in the prior art, in the subsequent dynamic balance calibration of the wavelength conversion module of the invention, the polymer adhesive ring and the balance weight may have better adhesion stability. In addition, when the polymer adhesive ring is assembled with the wavelength conversion substrate and the driving assembly, the adhesive layer may also be omitted to simplify the structure, so as to reduce working hours, and reduce a production procedure and production cost. Therefore, the wavelength conversion module of the invention may have better structural reliability.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
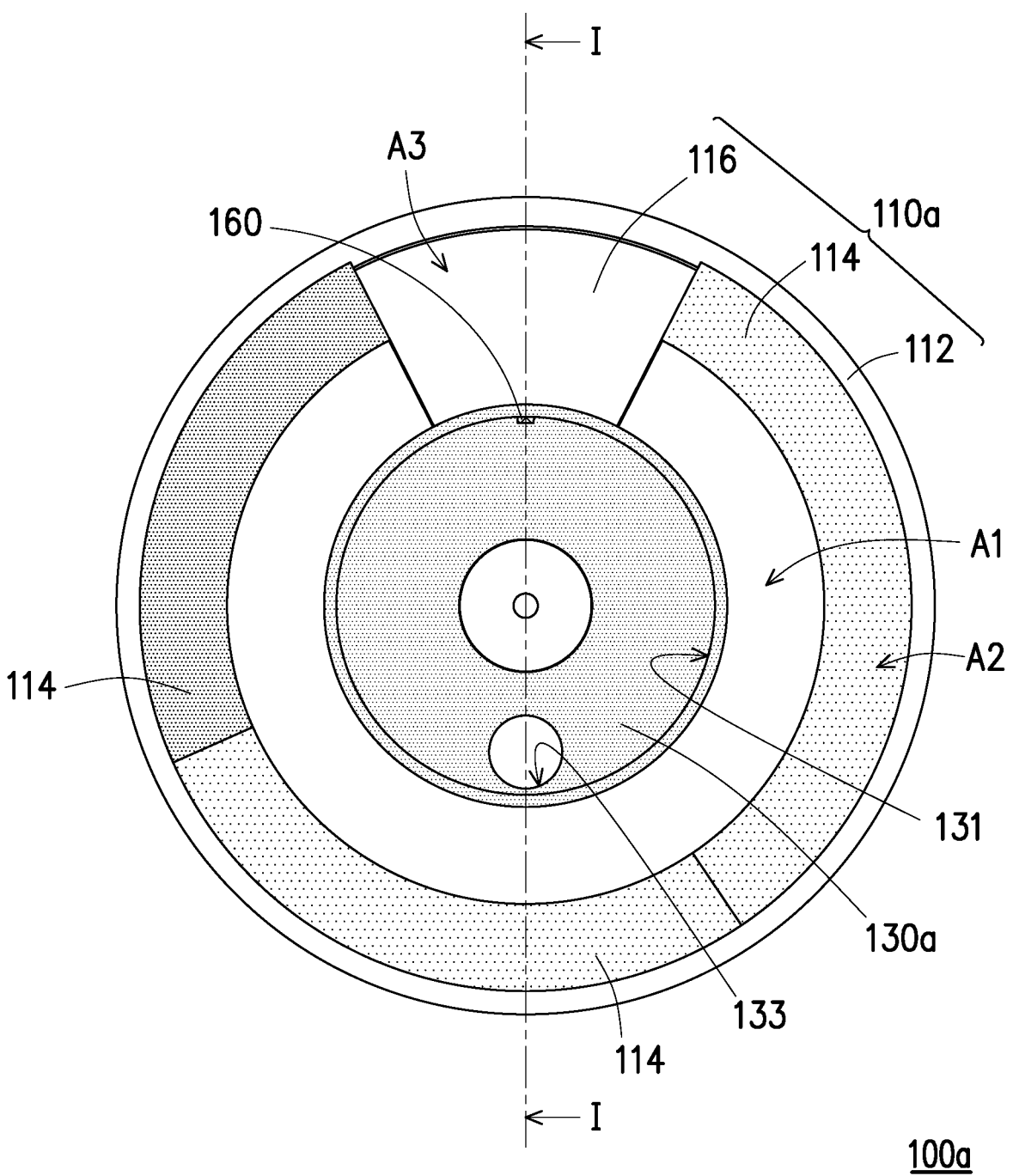
FIG. 1A is a schematic top view of a wavelength conversion module according to an embodiment of the invention.
Figure 1B:
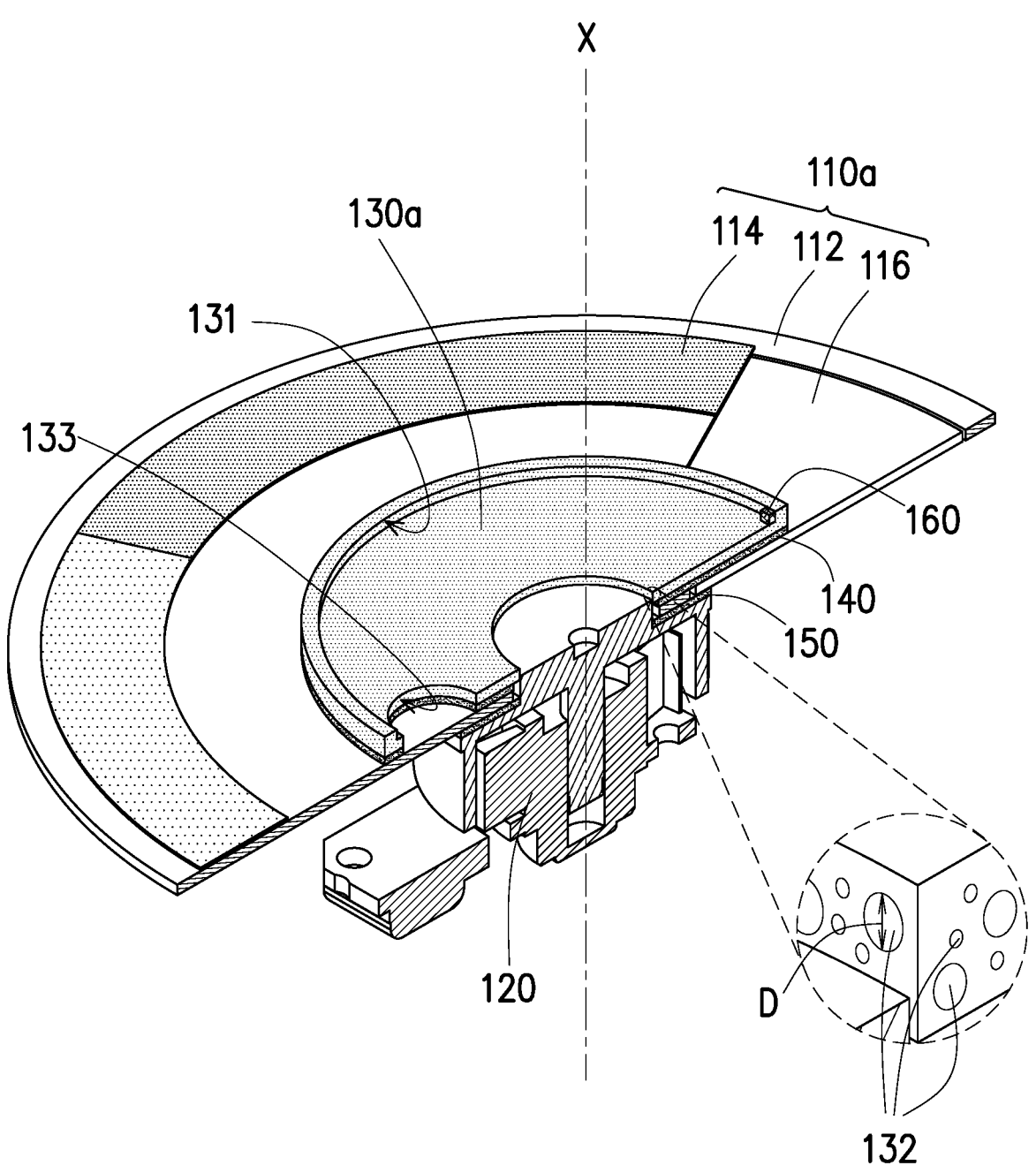
FIG. 1B is a three-dimensional schematic cross-sectional view of the wavelength conversion module of FIG. 1A.
Figure 1C:
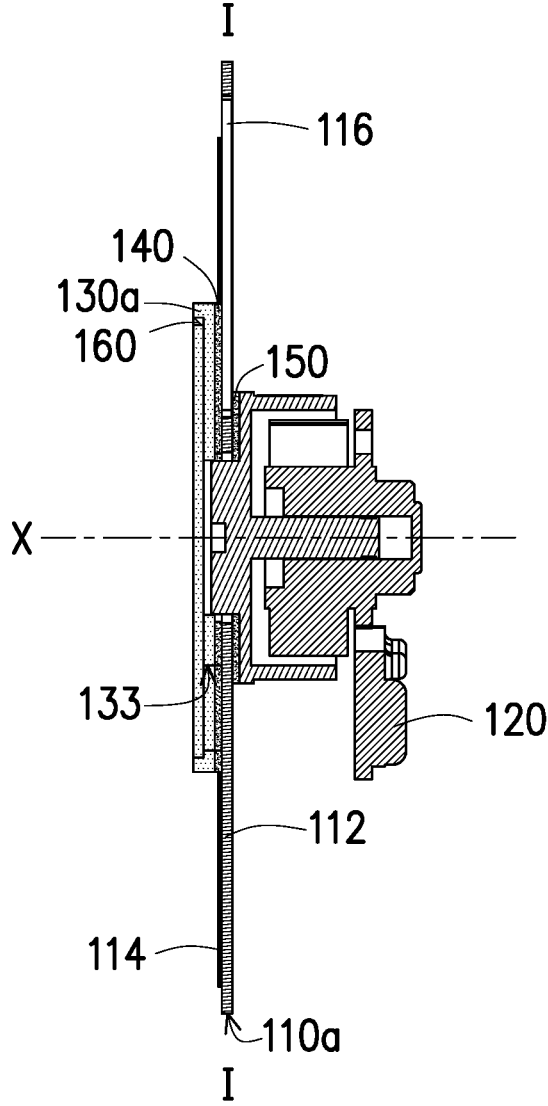
FIG. 1C is a schematic cross-sectional view of FIG. 1A viewing along a line I-I.

FIG. 1A is a schematic top view of a wavelength conversion module according to an embodiment of the invention. FIG. 1B is a three-dimensional schematic cross-sectional view of the wavelength conversion module of FIG. 1A. FIG. 1C is a schematic cross-sectional view of FIG. 1A viewing along a line I-I. Referring to FIG. 1A, FIG. 1B and FIG. 1C at the same time, in the embodiment, a wavelength conversion module 100a is, for example, a phosphor wheel. The wavelength conversion module 100a includes a wavelength conversion substrate 110a, a driving assembly 120, and a polymer adhesive ring 130a. The driving assembly 120 is, for example, a motor. The driving assembly 120 is connected to the wavelength conversion substrate 110a for driving the wavelength conversion substrate 110a to rotate around an axis X of the driving assembly 120. The polymer adhesive ring 130a is disposed on the wavelength conversion substrate 110a.

In detail, in the embodiment, the wavelength conversion substrate 110a and the polymer adhesive ring 130a are respectively arranged coaxially with the driving assembly 120. The wavelength conversion substrate 110a includes a disc substrate 112 and at least one wavelength conversion layer (three wavelength conversion layers 114 are schematically shown). The at least one wavelength conversion layer 114 further includes different phosphor layers for receiving an excitation light beam projected by an excitation light source to excite the phosphor layers and to generate a converted light beam, where a main waveband of the converted light beam is different from a main waveband of the excitation light beam. The disc substrate 112 is used to reflect the converted light beam. The wavelength conversion layers 114 are disposed on the disc substrate 112. In addition, the wavelength conversion substrate 110a of the embodiment further includes an optical plate 116, where the optical plate 116 is located in an opening of the disc substrate 112. The optical plate 116 is, for example, a light-transmitting plate or a reflecting plate, and is used to allow the excitation light beam to pass through or reflect the excitation light beam. In other embodiments, the wavelength conversion substrate 110a may not be provided with the optical plate 116, and the opening of the disc substrate 112 may allow the excitation beam to pass through.

Referring to FIG. 1B, selectively, in the embodiment, the polymer adhesive ring 130a may be mixed with a plurality of filling particles 132, where the filling particles 132 are, for example, a plurality of polymer particles, a plurality of glass particles, a plurality of ceramic particles, a plurality of metal particles, or a combination of the above particles. In particular, the filling particles 132 substantially account for less than 95% of a volume of the polymer adhesive ring 130a, and a particle size D of each filling particle 132 is, for example, substantially between 0.0001 mm and 0.5 mm. Certainly, in another embodiment, the polymer adhesive ring may also not be mixed with the filling particles, which still belongs to a protection scope of the invention. In addition, the polymer adhesive ring 130a of the embodiment further has at least one hole, where the hole is, for example, a through hole 133. Namely, the dynamic balance calibration of the wavelength conversion module 100a of the embodiment is achieved by using a weight-removing method.

In addition, referring to FIG. 1B and FIG. 1C at the same time, in the embodiment, the wavelength conversion module 100a further includes an adhesive layer 140 (i.e., a first adhesive layer) and an adhesive layer 150 (i.e., a second adhesive layer). The adhesive layer 140 is disposed between the polymer adhesive ring 130a and the wavelength conversion substrate 110a, and the adhesive layer 150 is disposed between the driving assembly 120 and the wavelength conversion substrate 110a. materials of the adhesive layer 140 and the adhesive layer 150 are, for example, respectively silicon adhesive, epoxy resin adhesive, acrylic adhesive, inorganic adhesive, or a combination of the above adhesives. In addition, the wavelength conversion module 100a of the embodiment may further include a balance weight 160, where the balance weight 160 is attached into a groove 131 of the polymer adhesive ring 130a. A material of the balance weight 160 is, for example, silicon adhesive, epoxy resin adhesive, acrylic adhesive, inorganic adhesive, or a combination of the above adhesives. Namely, the dynamic balance calibration of the wavelength conversion module 100a of the embodiment is achieved by using a weight-adding method.

Figure 2A:
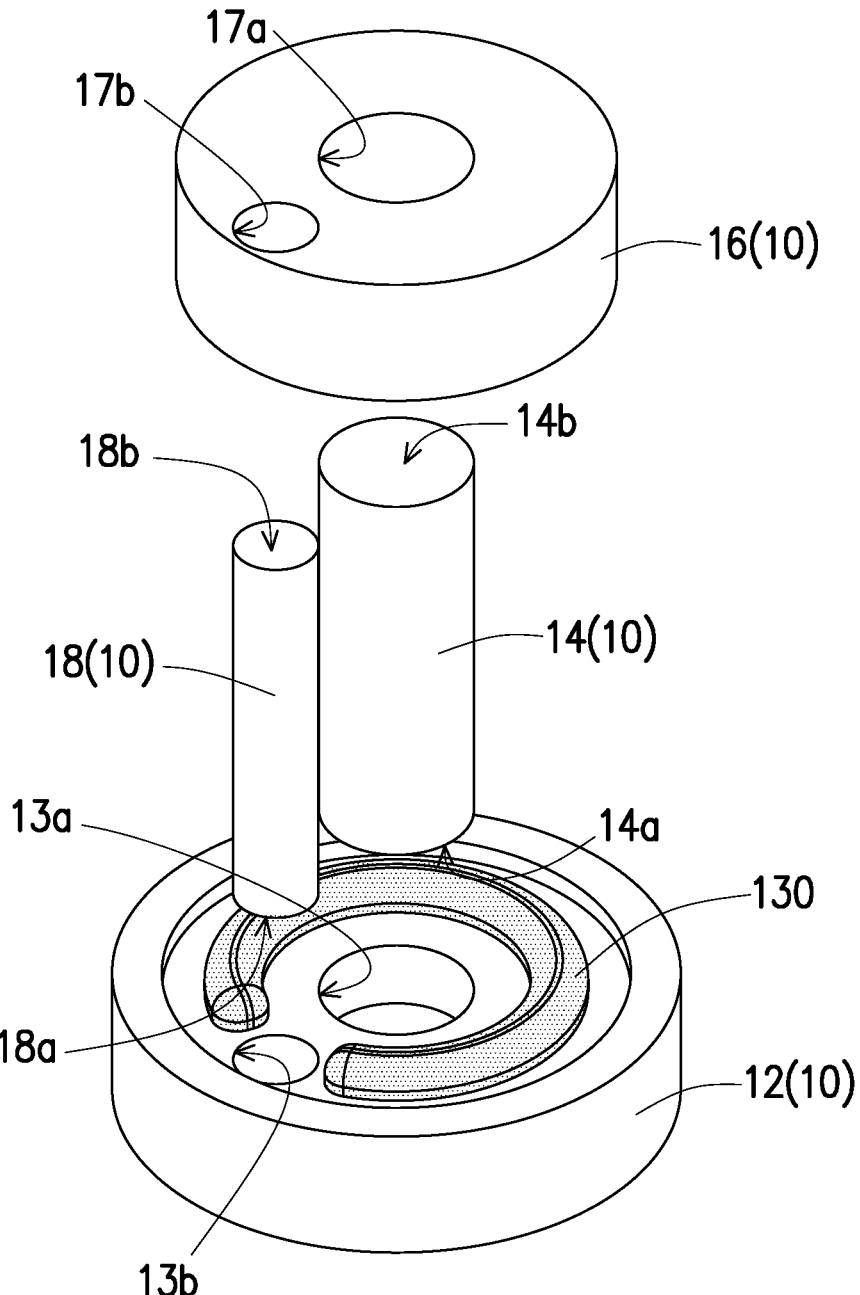
FIG. 2A to FIG. 2D are schematic diagrams of partial steps of a manufacturing method of the wavelength conversion module of FIG. 1A.

In the embodiment, the polymer adhesive ring 130a is mixed with the filling particles 132, and a main function of mixing the filling particles 132 is to increase rigidity and strength of a polymer adhesive material 130 (as shown in FIG. 2A) after being formed into the polymer adhesive ring 130a. For example, comparing the polymer adhesive ring 130a with the filling particles 132 and the polymer adhesive ring without the filling particles, the rigidity and strength are increased by more than 30%, and a tensile strength may be increased from less than 30 kg/cm$^2$ to be substantially greater than 50 kg/cm$^2$. In addition, the polymer adhesive ring 130a with the filling particles 132 may also improve moldability of the adhesive ring. For example, molding dimension accuracy is increased by more than 30%, and an appearance dimension tolerance after molding may be increased from ±0.5 mm to ±0.2 mm. In addition, the polymer adhesive ring 130a with the filling particles 132 may also improve the adhesion with the balance weight 160, for example, to increase adhesion strength by more than 30%. A material of the polymer adhesive ring 130a is, for example, silicon adhesive, acrylic adhesive, epoxy resin adhesive or a combination of the above adhesives.

Figure 2B:
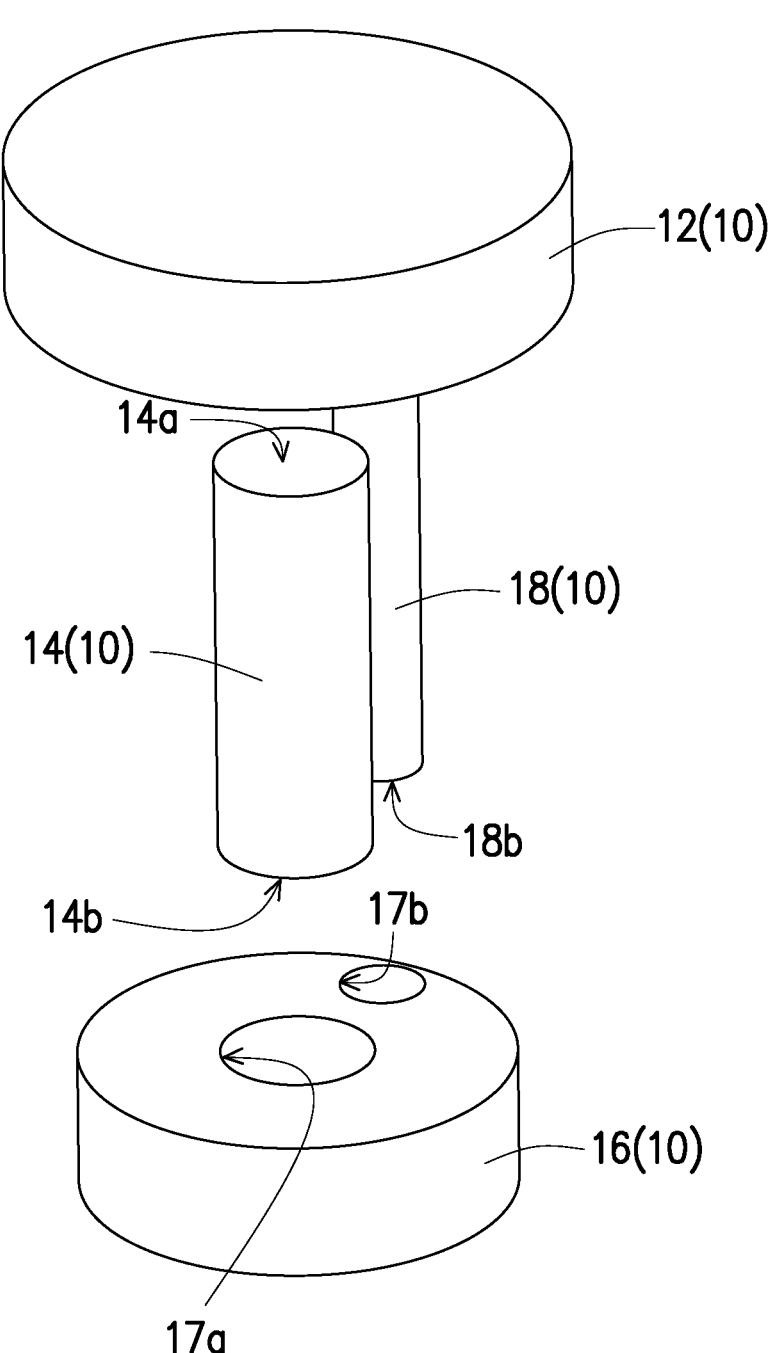

FIG. 2A to FIG. 2D are schematic diagrams of partial steps of a manufacturing method of the wavelength conversion module of FIG. 1A. It should be noted that FIG. 2B is a schematic three-dimensional view of FIG. 2A from another viewing angle. Regarding fabrication of the polymer adhesive ring 130a of the wavelength conversion module 100a, referring to FIG. 2A, FIG. 2B, and FIG. 2C at the same time, first, a mold 10 is provided. The mold 10 includes a first mold core 12, a support member 14 and a second mold core 16. The first mold core 12 has a first open pore 13a, and the second mold core 16 has a second open pore 17a. One end 14a of the support member 14 is detachably disposed in the first open pore 13a, and the second open pore 17a of the second mold core 16 is adapted to sleeve the another end 14b of the support member 14, so that the second mold core 16 is assembled on the first mold core 12. Furthermore, the mold 10 of the embodiment further includes an auxiliary support member 18, the first mold core 12 further has a third open pore 13b, and the second mold core 16 further has a fourth open pore 17b. One end 18a of the auxiliary support member 18 is detachably disposed in the third open pore 13b, and the fourth open pore 17b of the second mold core 16 is adapted to be sleeved onto another end 18b of the auxiliary support member 18, so that the second mold core 16 is assembled on the first mold core 12. Next, the polymer adhesive material 130 is filled in the first mold core 12 of the mold 10.

Figure 2C:
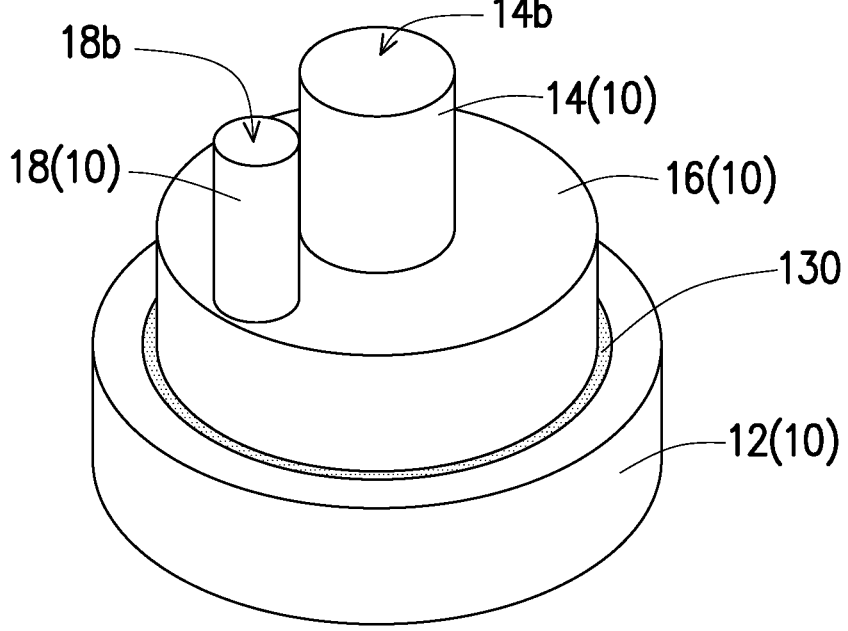
Figure 2D:
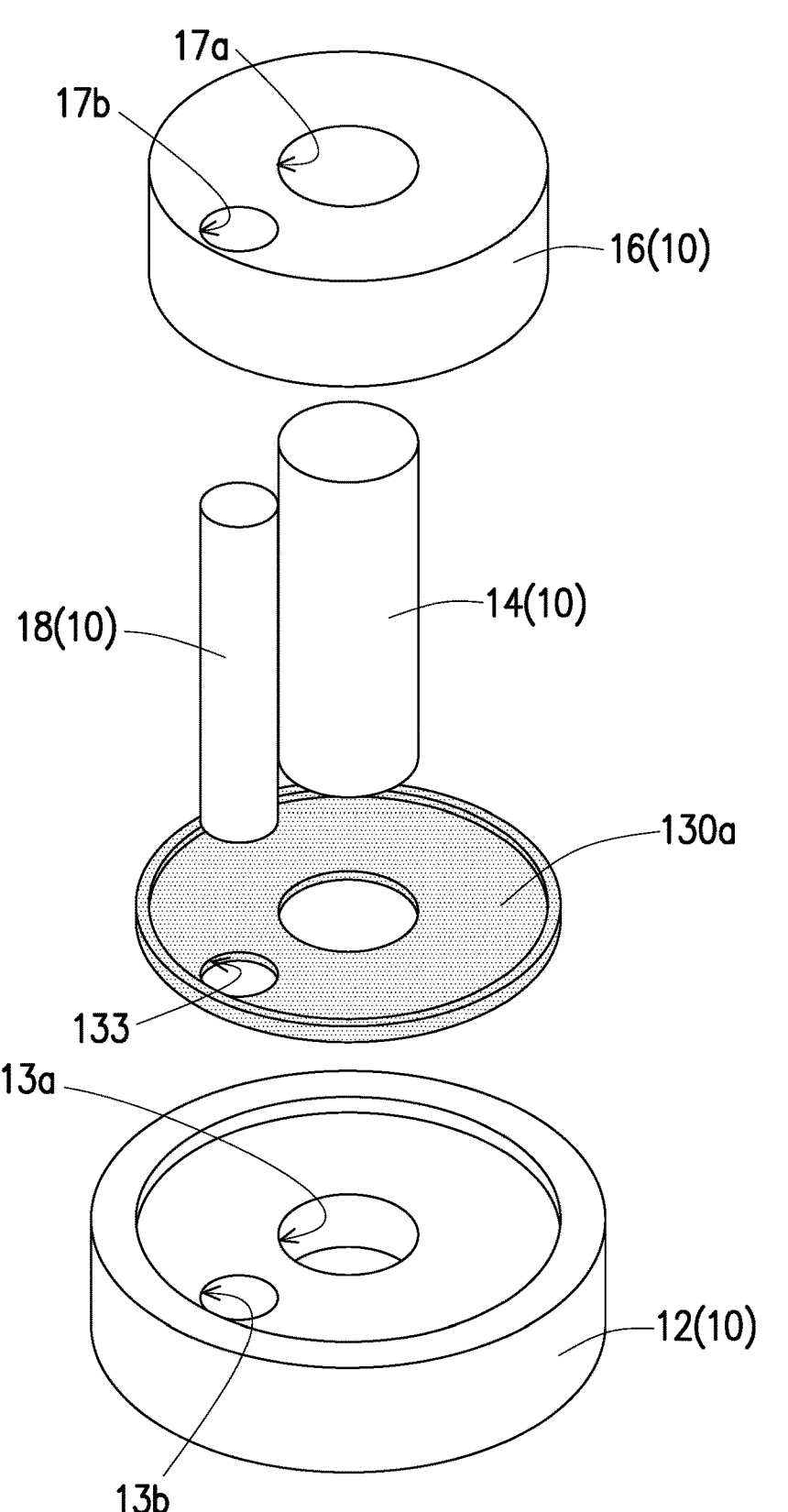

Then, referring to FIG. 2C, the second mold core 16 is moved to make the second mold core 16 apply pressure on the first mold core 12 filled with the polymer adhesive material 130 for curing and molding. Referring to FIG. 2D, after the polymer adhesive material 130 is cured and molded, the first mold core 12, the support member 14, the auxiliary support member 18, and the second mold core 16 are separated to form the polymer adhesive ring 130a. Corresponding to the position of the support member 14, the polymer adhesive ring 130a forms a hollow ring shape, and corresponding to the position of the auxiliary support member 18, the polymer adhesive ring 130a forms the through hole 133.

At last, referring to FIG. 1A, FIG. 1B and FIG. 2D, through the adhesive layers 140 and 150, the wavelength conversion substrate 110a, the driving assembly 120 and the polymer adhesive ring 130a are fixed. The driving assembly 120 is connected to the wavelength conversion substrate 110a to drive the wavelength conversion substrate 110a to rotate around the axis X of the driving assembly 120. The polymer adhesive ring 130a is disposed on the wavelength conversion substrate 110a. In this way, fabrication of the wavelength conversion module 100a is completed.

In brief, the polymer adhesive ring 130a of the embodiment is molded through the mold 10, and an appearance thereof may be close to a round symmetrical appearance of the existing metal processing or a complex asymmetrical appearance. Furthermore, the polymer adhesive material 130 may achieve the subsequent best adhesion with the balance weight 160 arranged for dynamic balance or the adhesive layers 140 and 150 through appropriate blending of polymer materials. Therefore, compared with the metal balance weight ring formed by the mechanical lathe, the milling machine, or the stamping process in the prior art, in the subsequent dynamic balance calibration of the wavelength conversion module 100a of the embodiment, the polymer adhesive ring 130a and the balance weight 160 may have better adhesive stability. In addition, the polymer adhesive ring 130a of the embodiment may be applied to both of the weight-adding method (such as addition of the balance weight 160) and the weight-removing method (such as configuration of the through hole 133). In addition, due to the high drilling processability of the polymer material, the polymer adhesive ring 130a of the embodiment also has an advantage of simple operation.

It should be noticed that reference numbers of the components and a part of contents of the aforementioned embodiment are also used in the following embodiment, wherein the same reference numbers denote the same or like components, and descriptions of the same technical contents are omitted. The aforementioned embodiment may be referred for descriptions of the omitted parts, and detailed descriptions thereof are not repeated in the following embodiment.

Figure 3A:
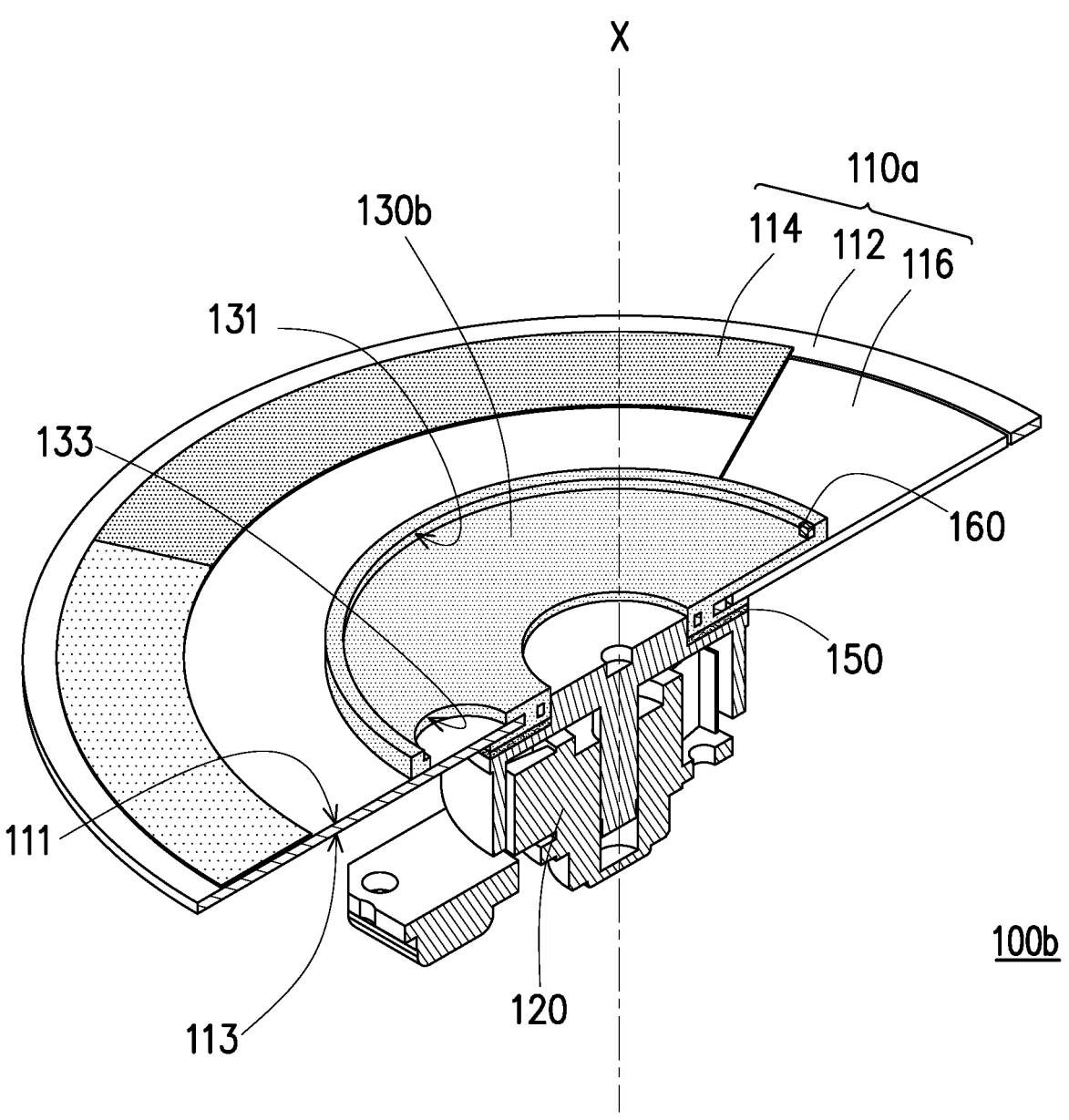
FIG. 3A is a three-dimensional schematic cross-sectional view of a wavelength conversion module according to another embodiment of the invention.
Figure 3B:
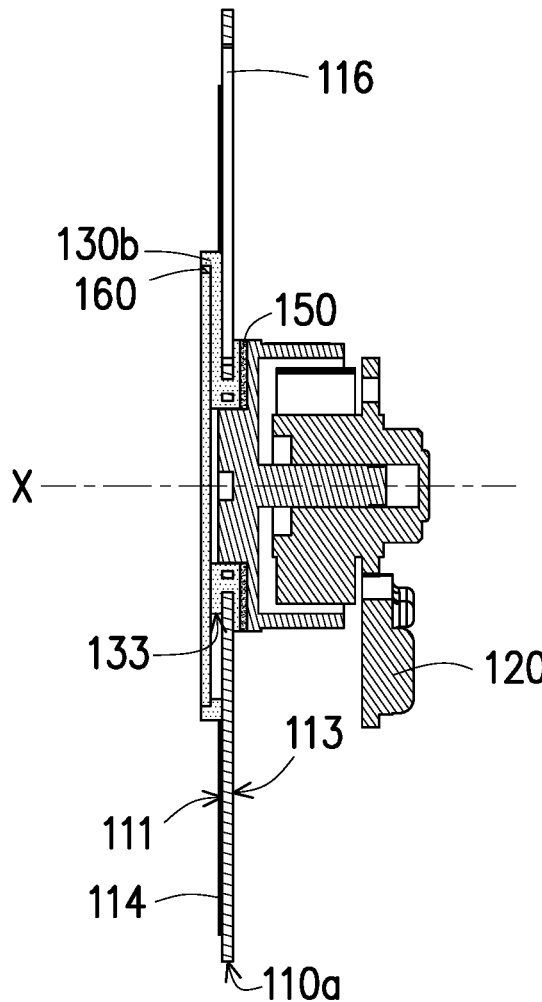
FIG. 3B is a schematic cross-sectional view of the wavelength conversion module of FIG. 3A.

FIG. 3A is a three-dimensional schematic cross-sectional view of a wavelength conversion module according to another embodiment of the invention. FIG. 3B is a schematic cross-sectional view of the wavelength conversion module of FIG. 3A. Referring to FIG. 1B, FIG. 1C, FIG. 3A, and FIG. 3B at the same time, a wavelength conversion module 100b of the embodiment is similar to the wavelength conversion module 100a of FIG. 1B, and a main difference there between is that in the embodiment, the polymer adhesive ring 130b is adhered on the wavelength conversion substrate 110a. In detail, the wavelength conversion substrate 110a of the embodiment has an upper surface 111 and a lower surface 113 opposite to each other, and the polymer adhesive ring 130b is located on the upper surface 111 and extends onto a part of the lower surface 113. The wavelength conversion substrate 110a is adhered and fixed by the polymer adhesive ring 130b. In addition, in the embodiment, the adhesive layer 150 is disposed between the driving assembly 120 and the polymer adhesive ring 130b on the lower surface 113 of the wavelength conversion substrate 110a.

Figure 4A:
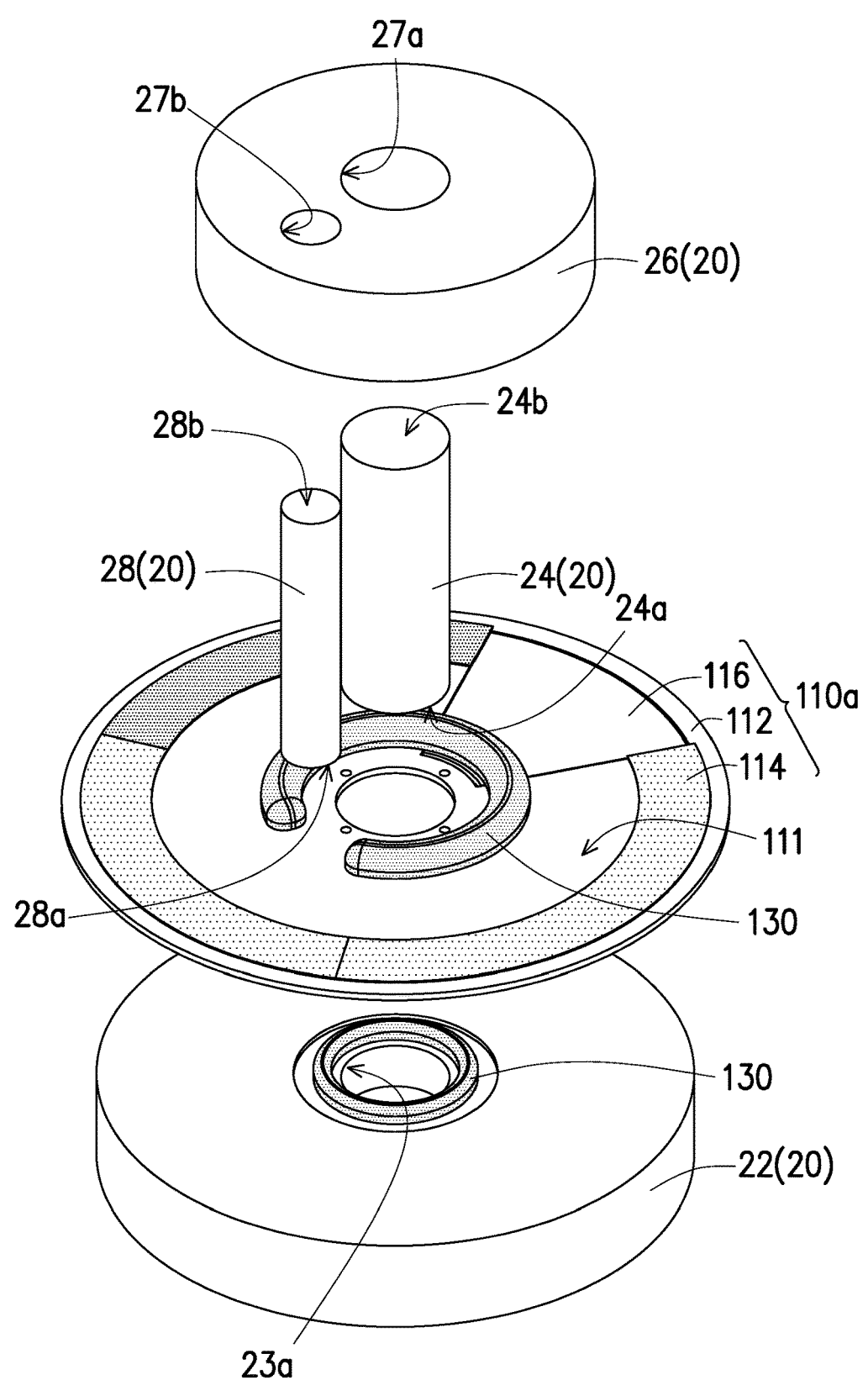
FIG. 4A to FIG. 4E are schematic diagrams of a manufacturing method of the wavelength conversion module of FIG. 3A.
Figure 4B:
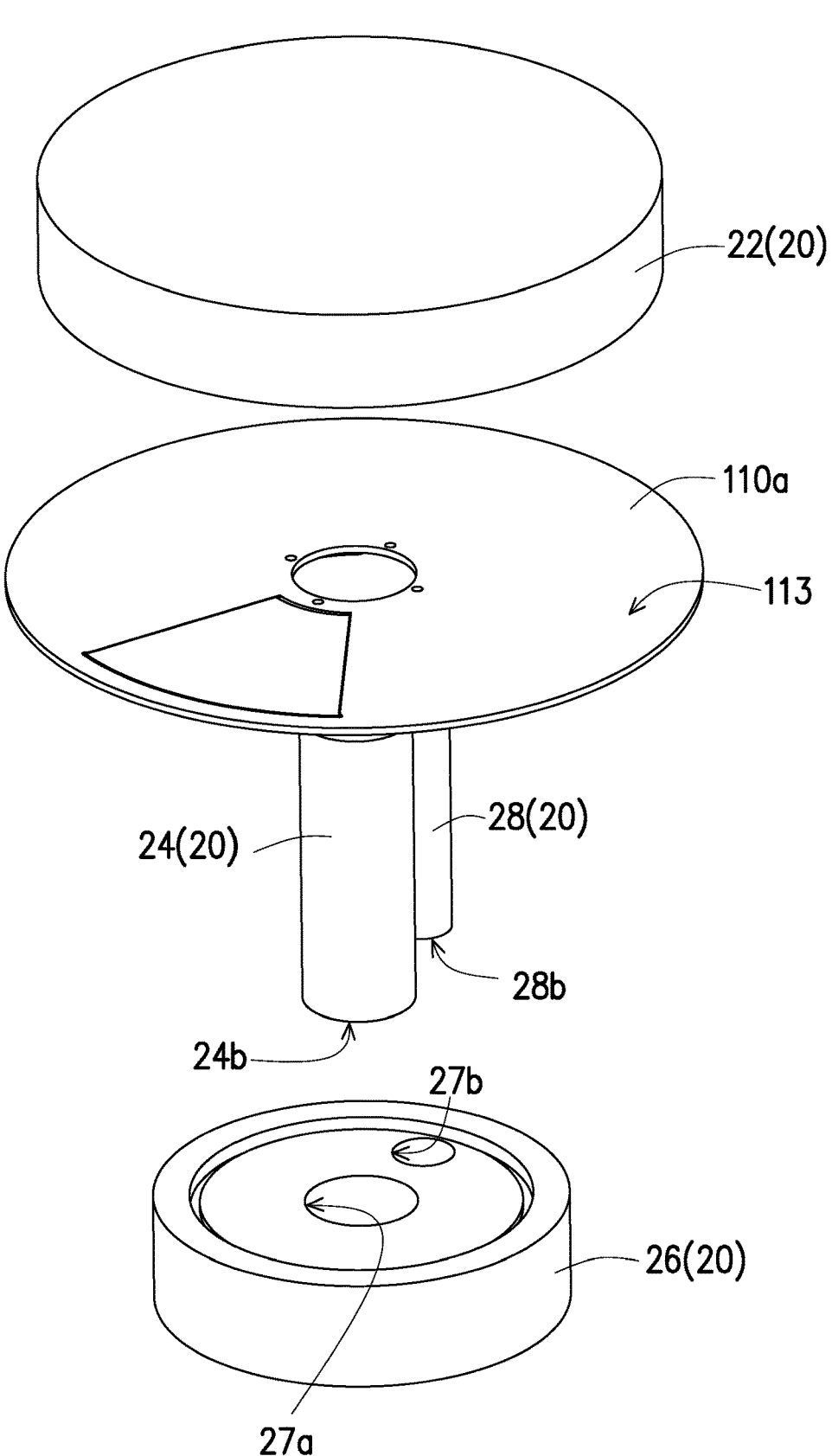
Figure 4C:
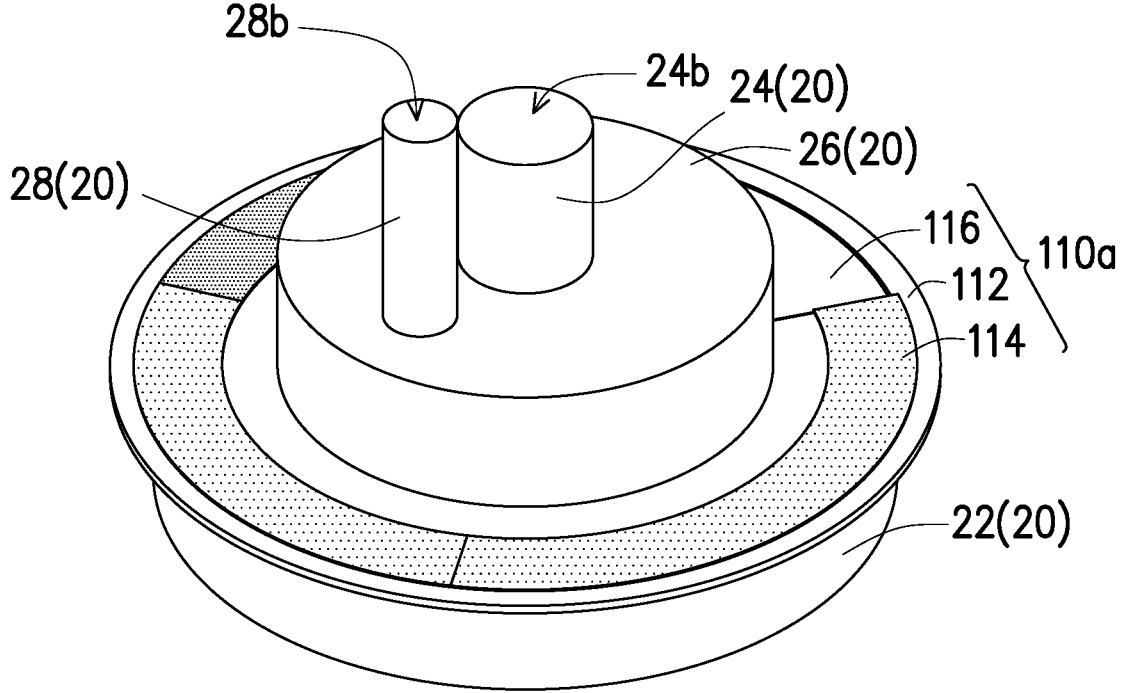
Figure 4D:
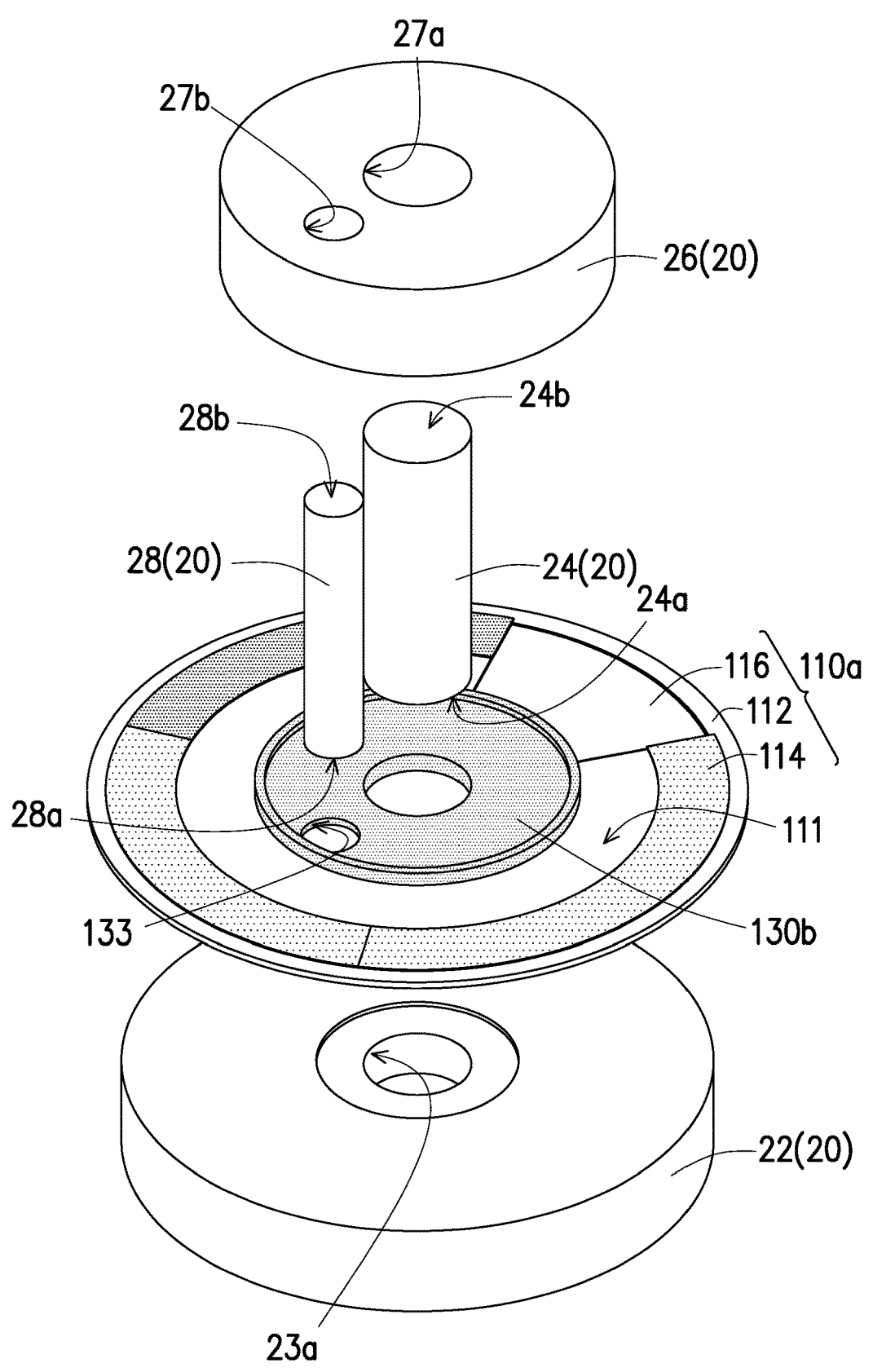
Figure 4E:
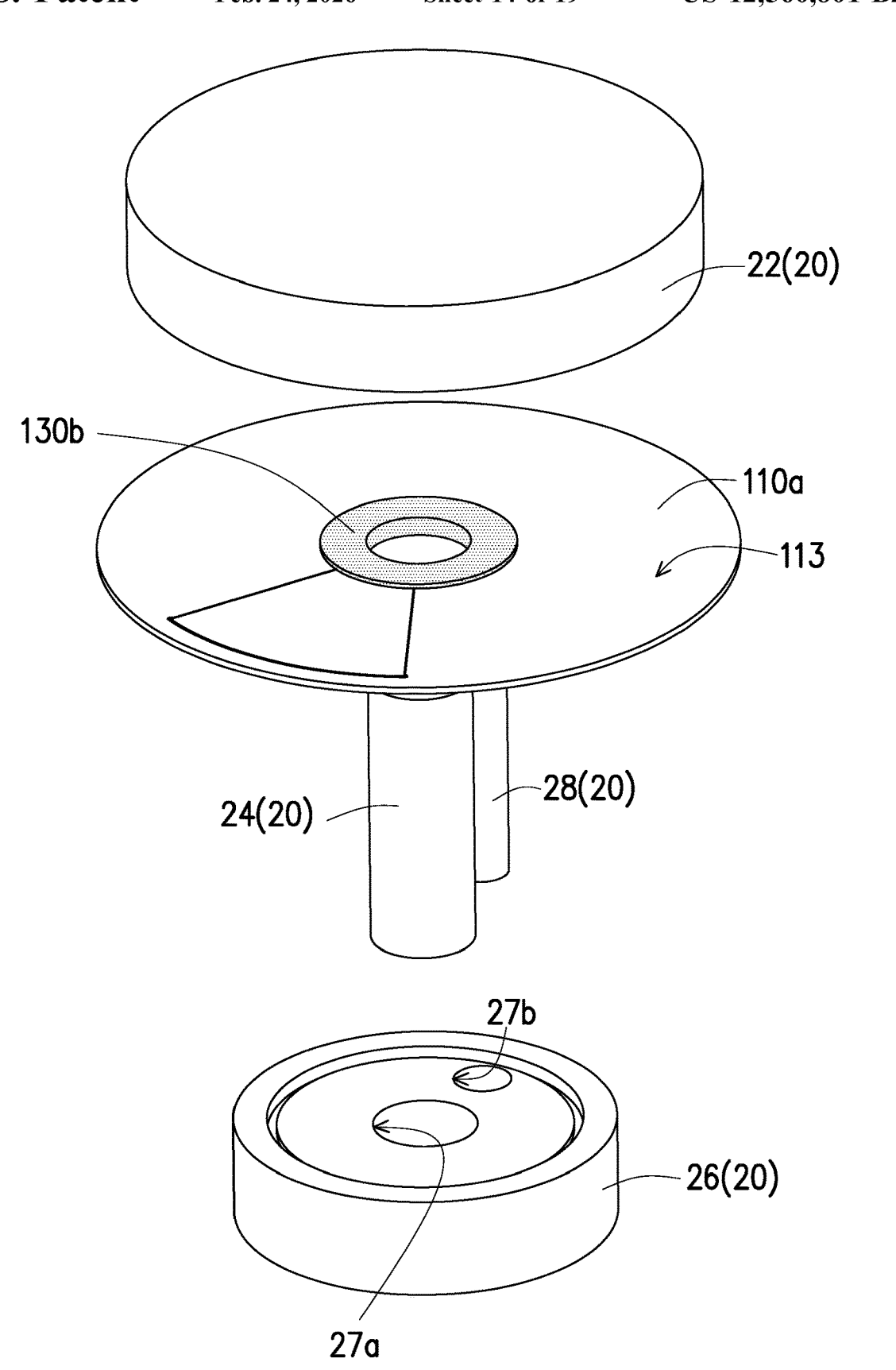

FIG. 4A to FIG. 4E are schematic diagrams of a manufacturing method of the wavelength conversion module of FIG. 3A. It should be noted that FIG. 4B is a schematic three-dimensional view of FIG. 4A at another viewing angle; and FIG. 4E is a schematic three-dimensional view of FIG. 4D at another viewing angle. In fabrication of the wavelength conversion module 110b, first, referring to FIG. 4A, FIG. 4B, and FIG. 4C at the same time, a mold 20 is provided, where the mold 20 includes a first mold core 22, a support member 24 and a second mold core 26. The first mold core 22 has a first open pore 23a, and the second mold core 26 has a second open pore 27a. One end 24a of the support member 24 is detachably disposed in the first open pore 23a, and the second open pore 27a of the second mold core 26 is adapted to be sleeved onto another end 24b of the support member 24, so that the second mold core 26 is assembled on the first mold core 22. Furthermore, the mold 20 of the embodiment further includes an auxiliary support member 28, and the second mold core 26 further has a fourth open pore 27b. The fourth open pore 27b of the second mold core 26 is adapted to be sleeved onto another end 28b of the auxiliary support member 28 so that the second mold core 26 is assembled on the first mold core 22.

Then, the wavelength conversion substrate 110a is provided, where the wavelength conversion substrate 110a is disposed between the first mold core 22 and the second mold core 26, and one end 28a of the auxiliary support member 28 is adapted to lean against the wavelength conversion substrate 110a. Then, referring to FIG. 4A again, the polymer adhesive material 130 is filled in the groove of the first mold core 22 of the mold 20 and the polymer adhesive material 130 is filled on the upper surface 111 of the wavelength conversion substrate 110a.

Then, referring to FIG. 4C again, the second mold core 26 is made to apply pressure on the wavelength conversion substrate 110a and the first mold core 22 filled with the polymer adhesive material 130 for curing and molding. A curing temperature of the polymer adhesive material 130 is lower than a melting point of the wavelength conversion substrate 110a, so that the structural stability of the wavelength conversion substrate 110a is affected. A material of the polymer adhesive material 130 is, for example, silicone adhesive, acrylic adhesive, epoxy resin adhesive, or a combination of the above adhesives.

Thereafter, referring to FIG. 4D and FIG. 4E at the same time, the first mold core 22, the support member 24, the auxiliary support member 28, and the second mold core 26 are separated to form the polymer adhesive ring 130b adhered to the wavelength conversion substrate 110a. At this time, the formed polymer adhesive ring 130b is located on the upper surface 111 of the wavelength conversion substrate 110a and extends onto a part of the lower surface 113. Furthermore, the polymer adhesive material 130 may be formed on the upper surface 111 and the lower surface 113 of the wavelength conversion substrate 110a through the through hole 111a of the wavelength conversion substrate 110a to fix the wavelength conversion substrate 110a and the optical plate 116. Corresponding to the position of the support member 24, the polymer adhesive ring 130b forms a hollow ring shape, and corresponding to the position of the auxiliary support member 28, the polymer adhesive ring 130b forms the through hole 133.

Then, referring to FIG. 3A and FIG. 4D at the same time, after the polymer adhesive ring 130b is formed on the wavelength conversion substrate 110a, the driving assembly 120 and the wavelength conversion substrate 110a are assembled. The driving assembly 120 is connected to the wavelength conversion substrate 110a through the adhesive layer 150 to drive the wavelength conversion substrate 110a to rotate around the axis X of the driving assembly 120. The polymer adhesive ring 130b is disposed on the wavelength conversion substrate 110a. In this way, fabrication of the wavelength conversion module 100b is completed.

In brief, in the embodiment, during the formation of the polymer adhesive ring 130b, the polymer adhesive ring 130b is adhered to the wavelength conversion substrate 110a and cured and molded, and then the adhesive layer 150 is used to adhere the driving assembly 120. In this way, selectivity and curing conditions of the polymer adhesive material 130 used for forming the polymer adhesive ring 130b are not much limited. At the same time, the use of the adhesive layer 140 as shown in FIG. 1B may be omitted, which may simplify the overall manufacturing process of the wavelength conversion module 100b, and improve structural reliability.

Figure 5A:
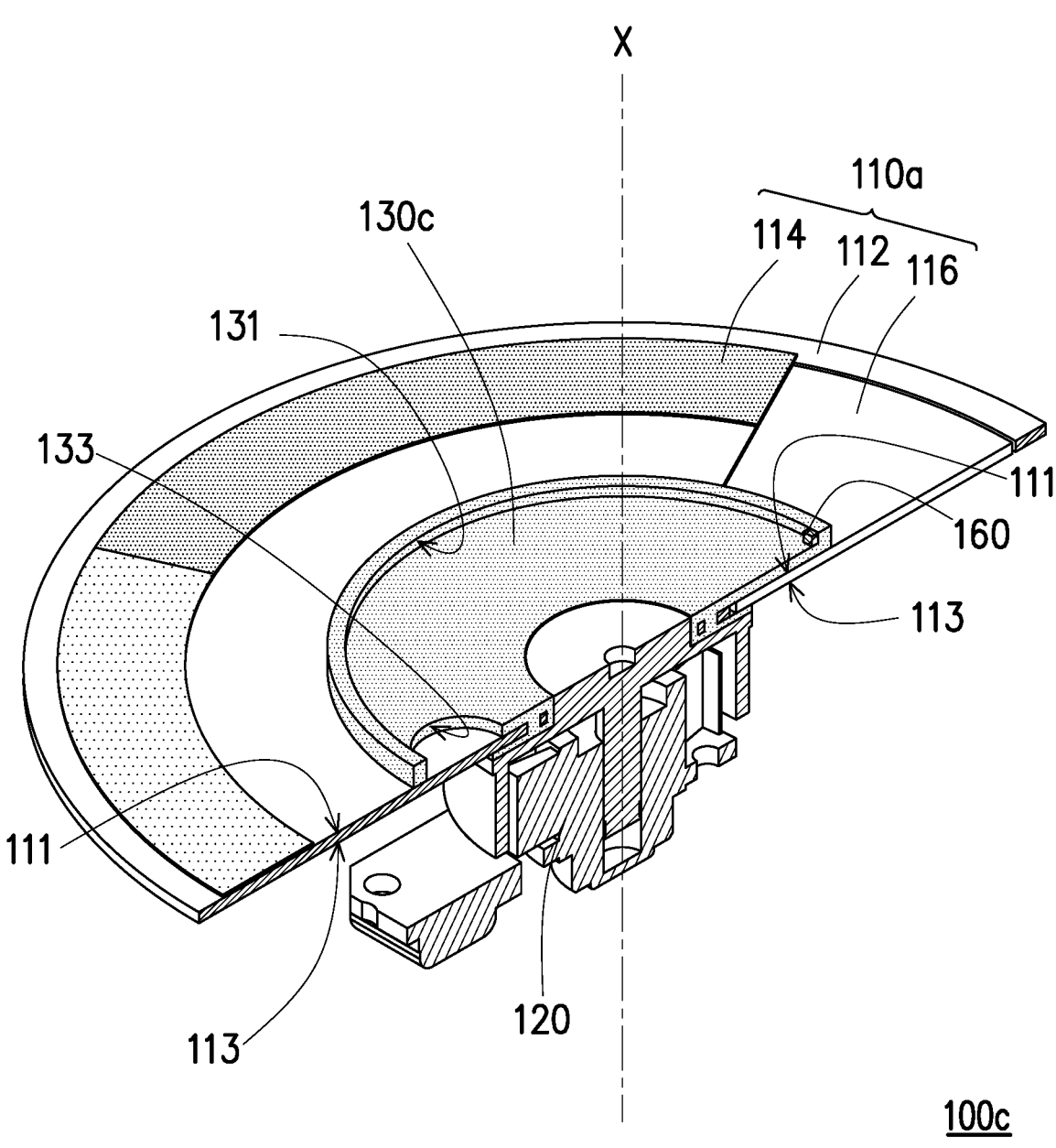
FIG. 5A is a three-dimensional schematic cross-sectional view of a wavelength conversion module according to another embodiment of the invention.
Figure 5B:
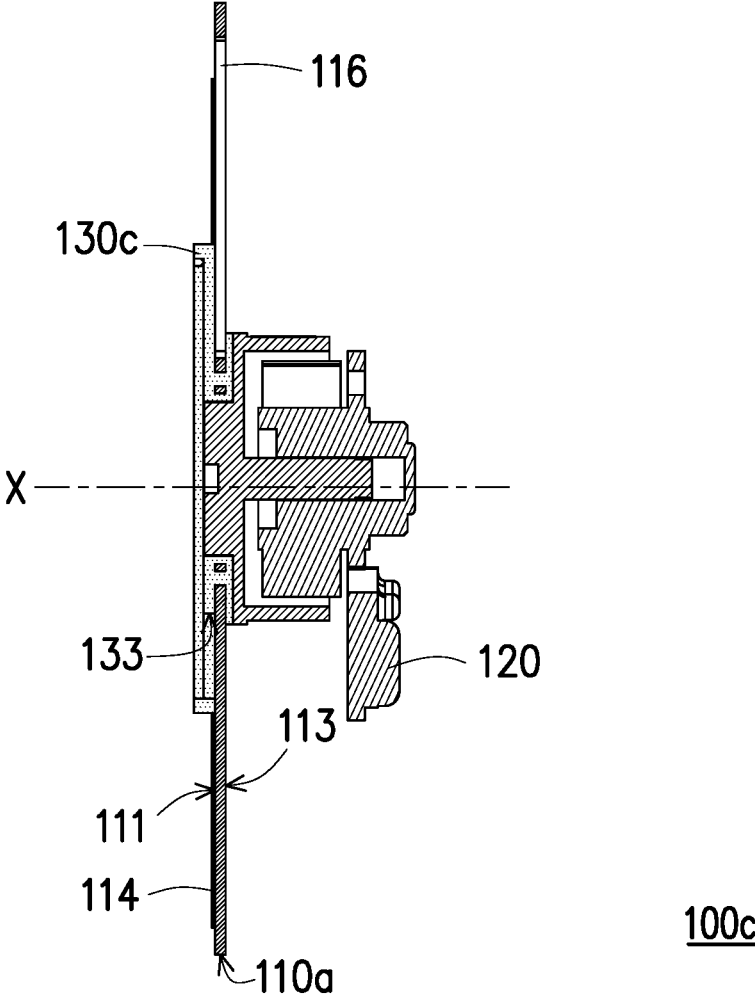
FIG. 5B is a schematic cross-sectional view of the wavelength conversion module of FIG. 5A.

FIG. 5A is a three-dimensional schematic cross-sectional view of a wavelength conversion module according to another embodiment of the invention. FIG. 5B is a schematic cross-sectional view of the wavelength conversion module of FIG. 5A. Referring to FIG. 1B, FIG. 1C, FIG. 5A, and FIG. 5B at the same time, a wavelength conversion module 100c of the embodiment is similar to the wavelength conversion module 100a of FIG. 1B, and a difference there between is that in the embodiment, the polymer adhesive ring 130c is adhered to the wavelength conversion substrate 110a and the driving assembly 120. In detail, the polymer adhesive ring 130c of the embodiment is located on the upper surface 111 of the wavelength conversion substrate 110a and extends between the lower surface 113 and the driving assembly 120. Namely, the polymer adhesive ring 130c, the wavelength conversion substrate 110a, and the driving assembly 120 of the embodiment are molded and adhered together by a mold during a molding process of the polymer adhesive material (such as the polymer adhesive material 130 in FIG. 4A). Therefore, the embodiment does not need to use the adhesive layers 140 and 150 in FIG. 1B, which means that two manufacturing procedures are omitted, and the manufacturing steps may be simplified. It should be noted that if thermal curing or sintering is used, the curing temperature of the polymer adhesive material should be lower than the melting point of the wavelength conversion substrate 110a and the driving assembly 120 to avoid affecting the stability of the wavelength conversion substrate 110a and the driving assembly 120. In addition, if the polymer adhesive material includes a solvent, the solvent that will not react with the wavelength conversion substrate 110a or the driving assembly 120 should be selected to avoid a dissolution phenomenon.

Figure 6A:
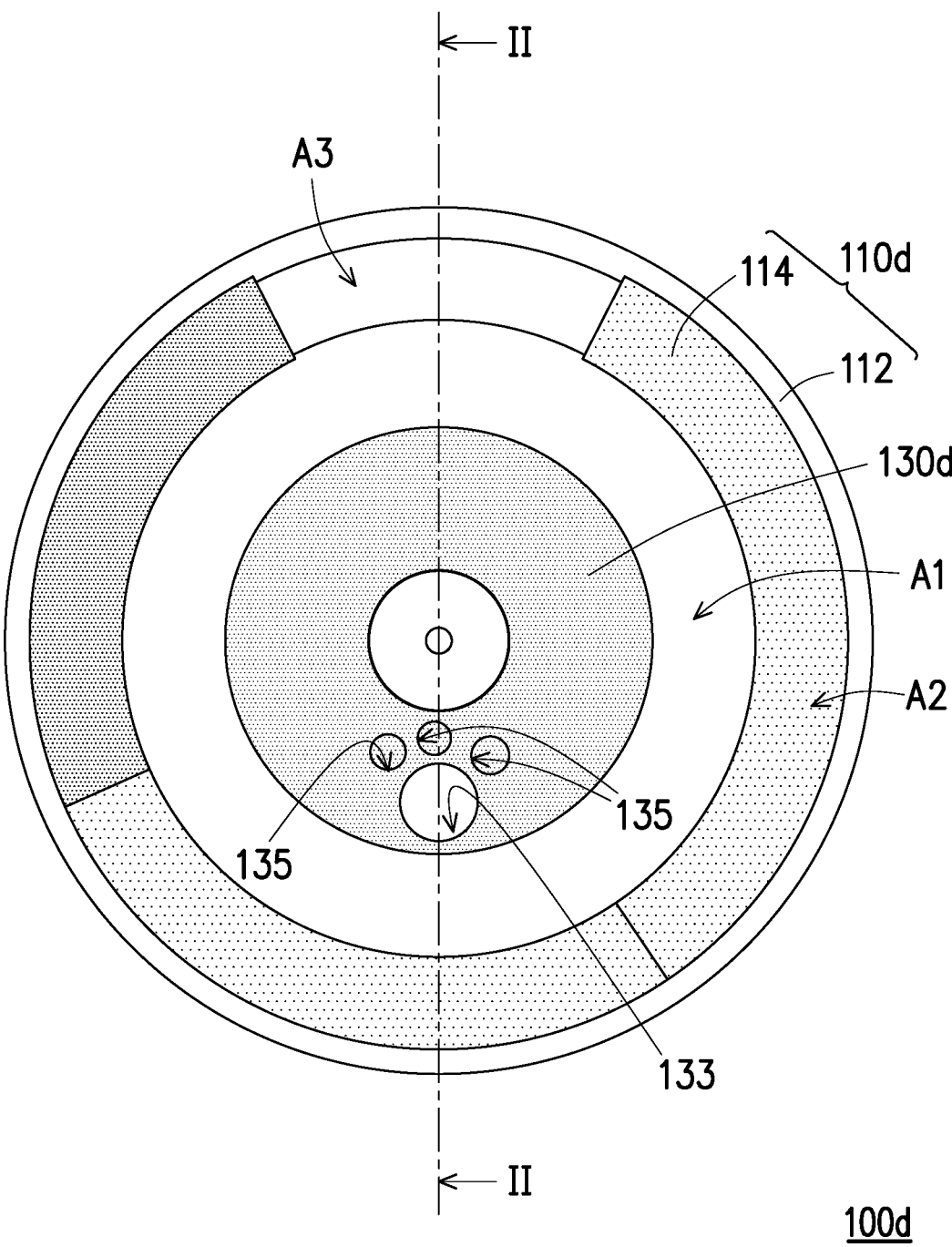
FIG. 6A is a schematic top view of a wavelength conversion module according to another embodiment of the invention.
Figure 6B:
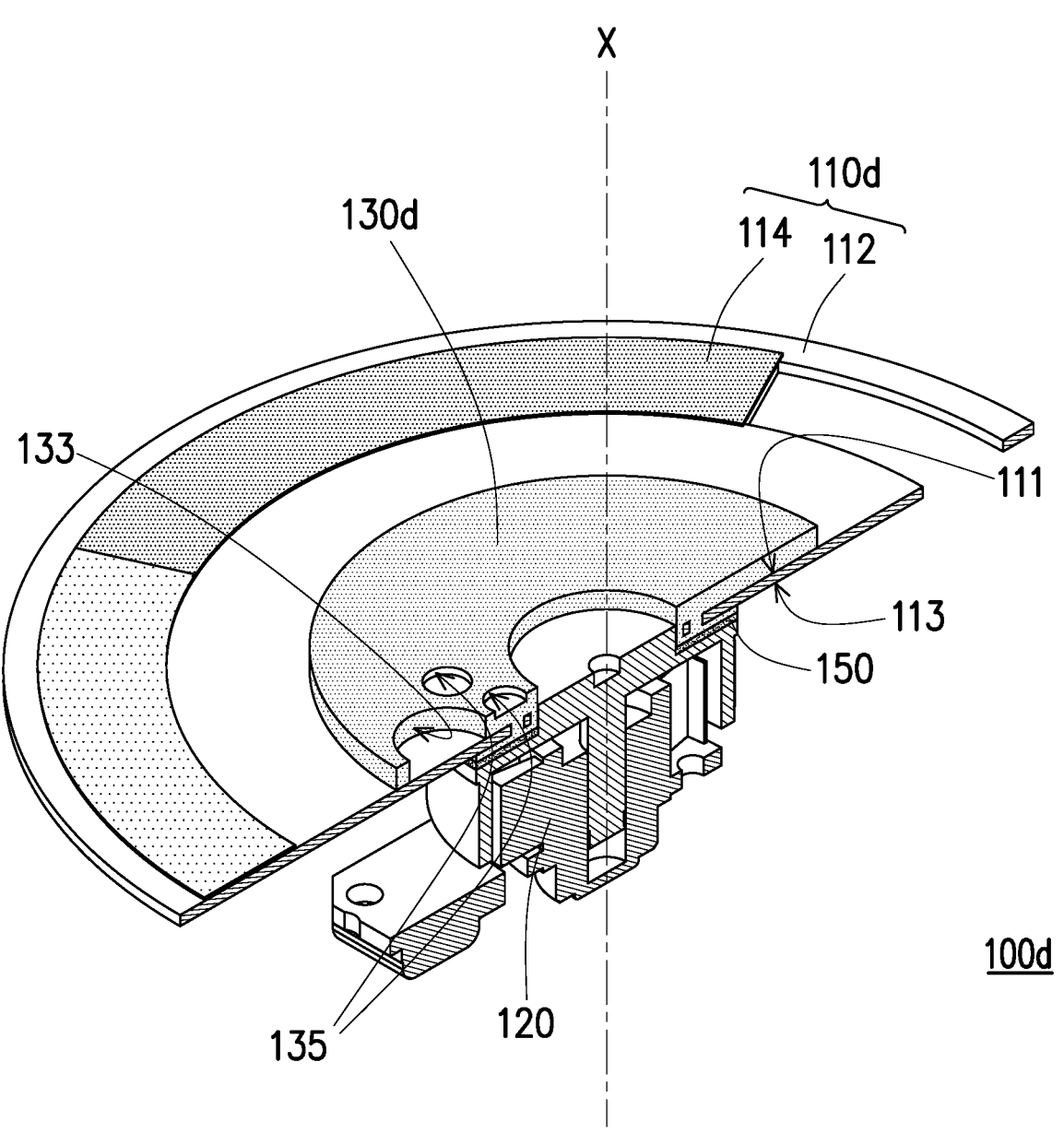
FIG. 6B is a three-dimensional schematic cross-sectional view of the wavelength conversion module of FIG. 6A.
Figure 6C:
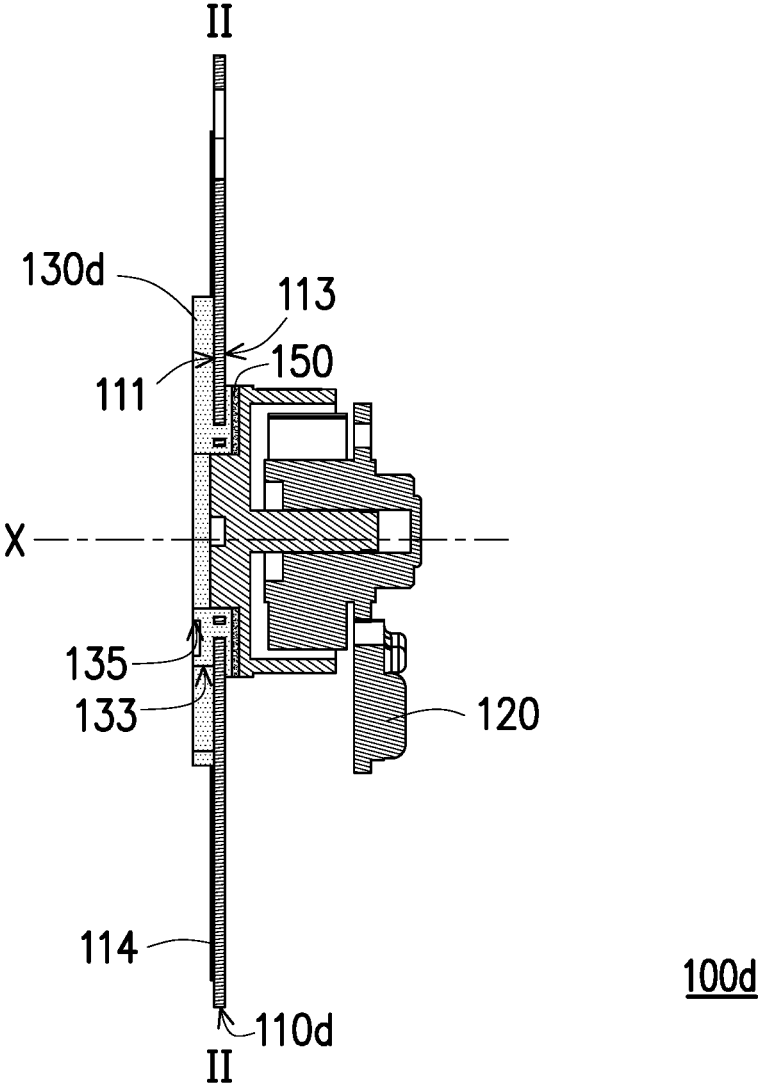
FIG. 6C is a schematic cross-sectional view of FIG. 6A viewing along a line II-II.

FIG. 6A is a schematic top view of a wavelength conversion module according to another embodiment of the invention. FIG. 6B is a three-dimensional schematic cross-sectional view of the wavelength conversion module of FIG. 6A. FIG. 6C is a schematic cross-sectional view of FIG. 6A viewing along a line II-II. Referring to FIG. 3A, FIG. 3B, FIG. 6A, FIG. 6B, and FIG. 6C at the same time, a wavelength conversion module 100d of the embodiment is similar to the wavelength conversion module 100b of FIG. 3A, and a difference there between is that in this embodiment, the wavelength conversion substrate 110d is not provided with the optical plate 116 of FIG. 3A. In detail, the wavelength conversion substrate 110d has a hollow ring shape, and the wavelength conversion substrate 110d and the polymer adhesive ring 130d are arranged coaxially with the driving assembly 120, respectively. The wavelength conversion substrate 110d only includes the disc substrate 112 and the wavelength conversion layer 114. The disc substrate 112 has an opening 112a. The opening 112a of the disc substrate 112 is used to allow the excitation light beam to pass through. The wavelength conversion layer 114 is disposed on the disc substrate 112. The polymer adhesive ring 130d is adhered to the wavelength conversion substrate 110d. Namely, the wavelength conversion module 100d of the embodiment is a phosphor wheel without coated glass.

Further, in the embodiment, the polymer adhesive ring 130d is located on the upper surface 111 of the wavelength conversion substrate 110d and extends onto a part of the lower surface 113. The polymer adhesive ring 130d has three blind holes 135 and one through hole 133. The polymer adhesive ring 130d is not provided with the groove 131 of FIG. 3A. Namely, an appearance of the polymer adhesive ring 130d of the embodiment is a thicker adhesive ring, and the through hole 133 and the blind holes 135 are generated at the same time during the curing and molding process, which produces a larger imbalance correction to reduce an amount of imbalance of the structure.

In summary, the embodiments of the invention have at least one of following advantages or effects. In the design of the wavelength conversion module of the invention, the polymer adhesive ring is disposed on the wavelength conversion substrate, and the polymer adhesive ring is manufactured by a mold. Compared with the metal balance weight ring formed by using the mechanical lathe, milling machine or the stamping process in the prior art, in the subsequent dynamic balance calibration of the wavelength conversion module of the invention, the polymer adhesive ring and the balance weight may have better adhesion stability. In addition, when the polymer adhesive ring is assembled with the wavelength conversion substrate and the driving assembly, the adhesive layers may also be omitted to simplify the structure, so as to reduce working hours, and reduce a production procedure and production cost. Therefore, the wavelength conversion module of the invention may have better structural reliability.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, comprising: a wavelength conversion substrate, a driving assembly, and a polymer adhesive ring, wherein the driving assembly is connected to the wavelength conversion substrate and is configured to drive the wavelength conversion substrate to rotate around an axis of the driving assembly; and the polymer adhesive ring is disposed on the wavelength conversion substrate, wherein the wavelength conversion substrate has a hollow ring shape, and the wavelength conversion substrate and the polymer adhesive ring are respectively arranged coaxially with the driving assembly.

2. The wavelength conversion module as claimed in claim 1, wherein a material of the polymer adhesive ring comprises silicon adhesive, acrylic adhesive, epoxy resin adhesive, or a combination of the above adhesives.

3. The wavelength conversion module as claimed in claim 1, wherein the polymer adhesive ring is mixed with a plurality of filling particles, and the filling particles comprise a plurality of polymer particles, a plurality of glass particles, a plurality of ceramic particles, a plurality of metal particles, or a combination of the above particles.

4. The wavelength conversion module as claimed in claim 3, wherein the filling particles substantially account for less than 95% of a volume of the polymer adhesive ring.

5. The wavelength conversion module as claimed in claim 3, wherein a particle size of each of the filling particles is substantially between 0.0001 mm and 0.5 mm.

6. The wavelength conversion module as claimed in claim 3, wherein a tensile strength of the polymer adhesive ring mixed with the filling particles is substantially greater than 50 kg/cm$^2$.

7. The wavelength conversion module as claimed in claim 1, further comprising:

a first adhesive layer, disposed between the polymer adhesive ring and the wavelength conversion substrate; and a second adhesive layer, disposed between the driving assembly and the wavelength conversion substrate.

8. The wavelength conversion module as claimed in claim 7, wherein materials of the first adhesive layer and the second adhesive layer respectively comprise silicon adhesive, epoxy resin adhesive, acrylic adhesive, inorganic adhesive, or a combination of the above adhesives.

9. The wavelength conversion module as claimed in claim 1, wherein the polymer adhesive ring is adhered to the wavelength conversion substrate, the wavelength conversion substrate has an upper surface and a lower surface opposite to each other, and the polymer adhesive ring is located on the upper surface and extends onto a part of the lower surface.

10. The wavelength conversion module as claimed in claim 9, further comprising:

an adhesive layer, disposed between the driving assembly and the polymer adhesive ring located on the lower surface of the wavelength conversion substrate.

11. The wavelength conversion module as claimed in claim 1, wherein the polymer adhesive ring is adhered to the wavelength conversion substrate and the driving assembly, the wavelength conversion substrate has an upper surface and a lower surface opposite to each other, and the polymer adhesive ring is located on the upper surface and extends between the lower surface and the driving assembly.

12. The wavelength conversion module as claimed in claim 1, wherein the wavelength conversion substrate further comprises an optical plate, wherein the optical plate comprises a light-transmitting plate or a reflecting plate.

13. The wavelength conversion module as claimed in claim 1, further comprising:

a balance weight, attached into a groove of the polymer adhesive ring, wherein a material of the balance weight comprises silicon adhesive, epoxy resin adhesive, acrylic adhesive, inorganic adhesive, or a combination of the above adhesives.

14. The wavelength conversion module as claimed in claim 1, wherein the polymer adhesive ring has at least one hole, and the at least one hole comprises at least one blind hole or at least one through hole.

15. A manufacturing method of a wavelength conversion module, comprising:

providing a mold, wherein the mold comprises a first mold core, a support member, and a second mold core, the first mold core has a first open pore, the second mold core has a second open pore, one end of the support member is detachably disposed in the first open pore, and the second open pore of the second mold core is adapted to be sleeved onto another end of the support member, so that the second mold core is assembled on the first mold core;

filling a polymer adhesive material in the first mold core of the mold;

making the second mold core to apply pressure on the first mold core filled with the polymer adhesive material for curing and molding;

separating the first mold core, the support member, and the second mold core to form a polymer adhesive ring;

providing a wavelength conversion substrate; and assembling a driving assembly and the wavelength conversion substrate, wherein the driving assembly is connected to the wavelength conversion substrate.

16. The manufacturing method of the wavelength conversion module as claimed in claim 15, wherein the wavelength conversion substrate is provided before filling the polymer adhesive material in the first mold core of the mold, and the wavelength conversion substrate is disposed between the first mold core and the second mold core;

when filling the polymer adhesive material in the first mold core, another polymer adhesive material is disposed on an upper surface of the wavelength conversion substrate at the same time;

the second mold core applies pressure on the wavelength conversion substrate and the first mold core filled with the polymer adhesive material; and the first mold core, the support member, and the second mold core are separated to form the polymer adhesive ring adhered to the wavelength conversion substrate.

17. The manufacturing method of the wavelength conversion module as claimed in claim 16, wherein a curing temperature of the polymer adhesive material is lower than a melting point of the wavelength conversion substrate.

18. The manufacturing method of the wavelength conversion module as claimed in claim 17, wherein the polymer adhesive ring is located on the upper surface of the wavelength conversion substrate and extends onto a part of a lower surface of the wavelength conversion substrate.

19. A wavelength conversion module, comprising: a wavelength conversion substrate, a driving assembly, and a polymer adhesive ring, wherein the driving assembly is connected to the wavelength conversion substrate and is configured to drive the wavelength conversion substrate to rotate around an axis of the driving assembly; and the polymer adhesive ring is disposed on the wavelength conversion substrate, wherein the polymer adhesive ring is mixed with a plurality of filling particles, and the filling particles comprise a plurality of polymer particles, a plurality of glass particles, a plurality of ceramic particles, a plurality of metal particles, or a combination of the above particles, wherein a particle size of each of the filling particles is substantially between 0.0001 mm and 0.5 mm.

20. A wavelength conversion module, comprising: a wavelength conversion substrate, a driving assembly, and a polymer adhesive ring, wherein the driving assembly is connected to the wavelength conversion substrate and is configured to drive the wavelength conversion substrate to rotate around an axis of the driving assembly; and the polymer adhesive ring is disposed on the wavelength conversion substrate, wherein the polymer adhesive ring is mixed with a plurality of filling particles, and the filling particles comprise a plurality of polymer particles, a plurality of glass particles, a plurality of ceramic particles, a plurality of metal particles, or a combination of the above particles, wherein a tensile strength of the polymer adhesive ring mixed with the filling particles is substantially greater than 50 $kg/cm^2$.

* * * * *